United States Patent [19]

Terry

[11] 3,890,182
[45] June 17, 1975

[54] METHOD AND APPARATUS FOR APPLYING A COVER TO A CONDUIT

[75] Inventor: Rupert Douglas Terry, Toledo, Ohio

[73] Assignee: Johns-Manville Corporation, Denver, Colo.

[22] Filed: Apr. 4, 1973

[21] Appl. No.: 347,769

[52] U.S. Cl. ............. 156/187; 156/184; 156/392; 156/446; 242/7.23
[51] Int. Cl. ...... B65c 3/12; B65c 9/04; B65h 81/00
[58] Field of Search ............................. 156/51–53, 156/128, 133, 184, 185, 187, 188, 200, 215, 218, 263, 272, 282, 311, 322, 392, 405, 443, 446–448, 457, 458, 461, 475, 516, 517, 521; 242/7.01, 7.21, 7.23, 66, 78.7

[56] References Cited
UNITED STATES PATENTS

| | | | |
|---|---|---|---|
| 2,110,565 | 3/1938 | Yeager | 156/392 |
| 2,613,007 | 10/1952 | Von Hofe | 156/282 |
| 2,763,236 | 9/1956 | Cummings | 156/392 |
| 3,045,285 | 7/1962 | Baird et al. | 156/193 |
| 3,342,014 | 9/1967 | Prager | 156/457 |
| 3,553,046 | 1/1971 | Crawford et al. | 156/184 |
| 3,577,293 | 5/1971 | Ritterhoff | 156/187 |
| 3,658,614 | 4/1972 | Beck | 156/187 |
| 3,755,039 | 8/1973 | Terry | 156/187 |

*Primary Examiner*—Clifton B. Cosby
*Assistant Examiner*—John E. Kittle
*Attorney, Agent, or Firm*—Robert M. Krone; John D. Lister

[57] ABSTRACT

A sheet of cover material having a heat activated adhesive on one major face is wrapped about and bonded to an outer surface of a duct. The duct is positioned on a pair of rolls, one of which is heated, and is pressed against the rolls through a pressure applicator. The rolls and an endless belt assembly of the pressure applicator are all driven at the same surface speed to effect rotation of the duct while maintaining the duct in a fixed position. As the duct is rotating a finite length of the cover material is fed between the heated roll and the duct whereby the cover is bonded to and wrapped about the duct. Once the duct is wrapped, the duct is ejected from the apparatus by stopping the endless belt assembly of the pressure applicator. With the endless belt assembly stopped, the rolls move the duct out of the apparatus.

10 Claims, 3 Drawing Figures

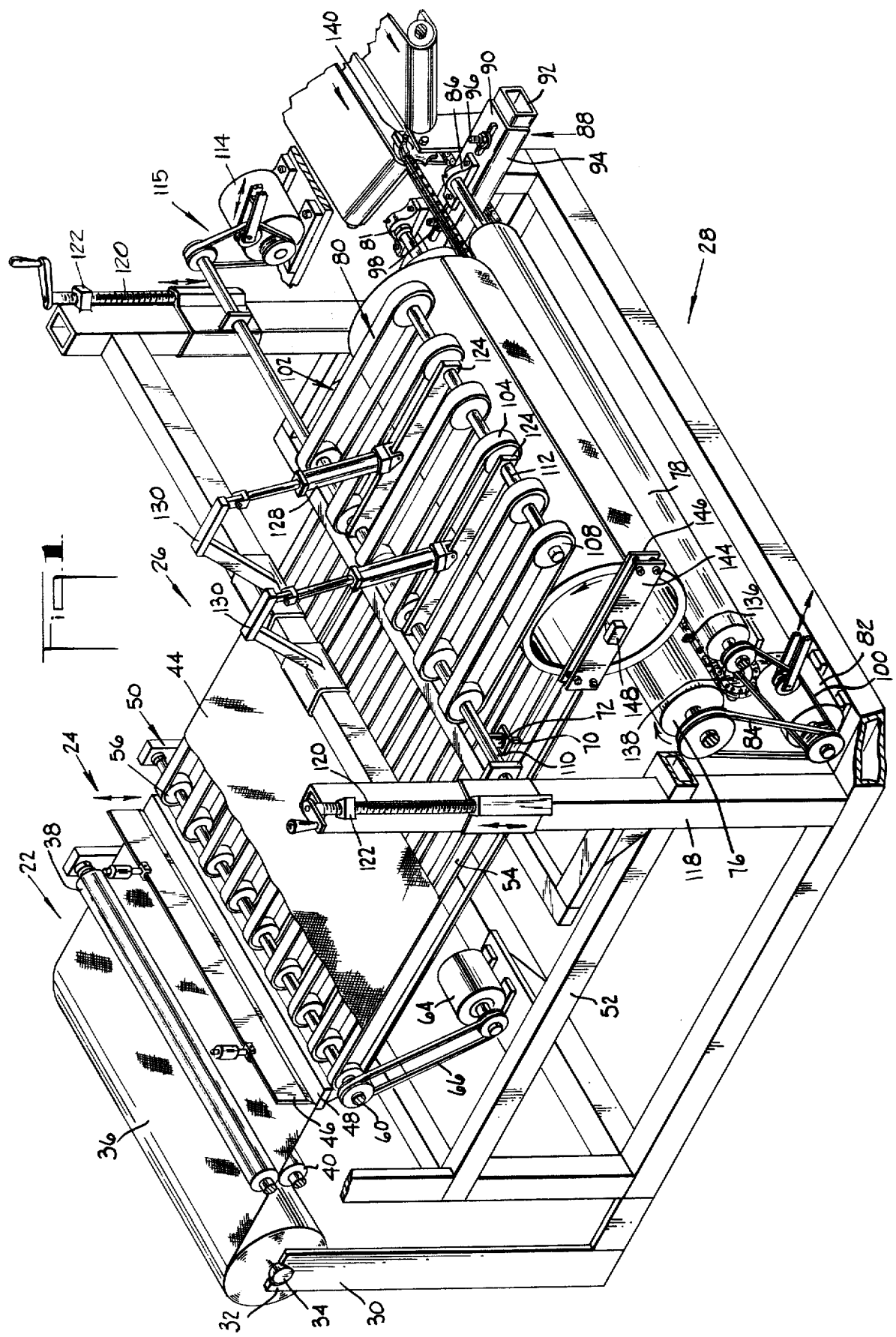

PATENTED JUN 17 1975
SHEET 2
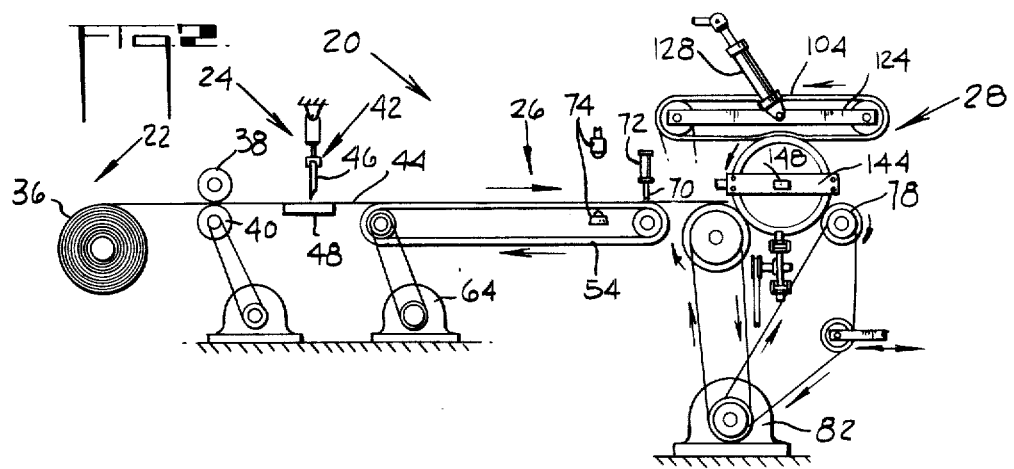
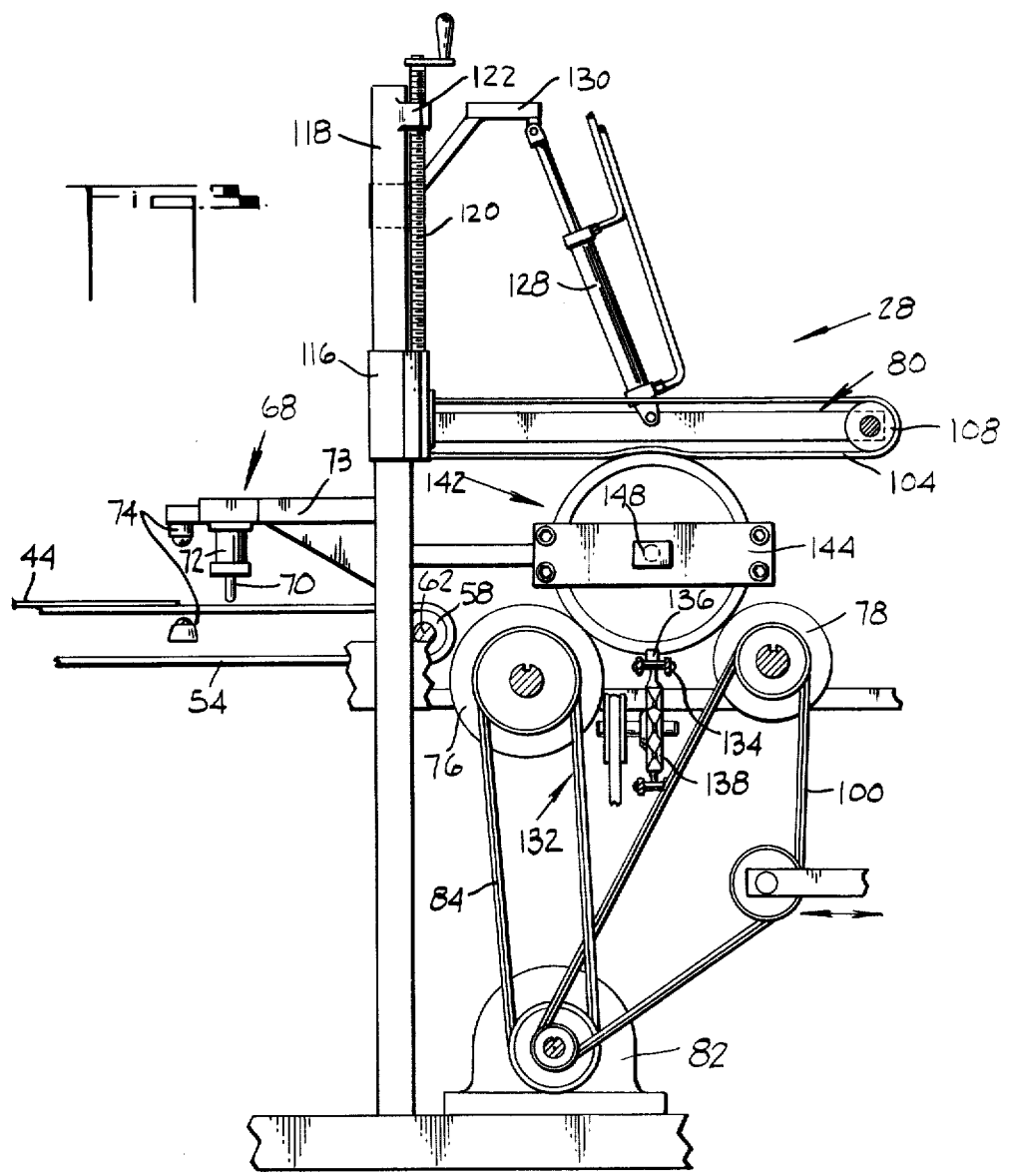

METHOD AND APPARATUS FOR APPLYING A COVER TO A CONDUIT

BACKGROUND OF THE INVENTION

The present invention is directed to an improved method and apparatus for applying a cover to a tubular duct.

Covers comprising various laminates are applied to ducts such as fiber glass ducts to serve as vapor barriers, improve the appearance of the product, etc. Many of these laminated covers include an inside layer of heat activated adhesive, such as a plastic sheet or film, which melts and becomes tacky when heated. While heated the cover is wrapped about the duct and allowed to cool thereby adhering the cover to the duct. In this process the cover must be properly located on the duct within certain tolerances and the cover must be uniformly applied to the duct so that the cover on the finished product is smooth. The process should be economical and capable of high production rates.

Previously, laminated pipe and duct covers have been applied to pipes and ducts by first placing a cover on a hot plate. When the plastic layer of the laminated cover melted and became tacky, a duct was placed on the cover and the cover was rolled onto the duct by hand. This method is slow and costly. In addition a uniform, a smooth and accurate placement of the cover on the duct was not always obtained.

BRIEF SUMMARY OF THE INVENTION

It is an object of the present invention to provide a method and apparatus for accurately and rapidly applying laminated covers having an inner layer of adhesive to ducts in a uniform manner so that the cover of the finished product will have a smooth unwrinkled appearance.

When employing the method and apparatus of the present invention, a sheet of laminated cover material having a heat activated adhesive (e.g., a plastic film) on one major face is wrapped about and bonded to an outer surface of a duct.

In the process of the present invention, the duct is automatically positioned on a heated roll and a cold roll. The duct is pressed against the rolls by a pressure applicator which includes an endless belt assembly. The rolls and endless belt assembly are all driven at the same surface speed to effect rotation of the duct while maintaining the duct in one location. As the duct is rotating a finite length of the laminated cover material is fed between the heated roll and the duct whereby the cover is bonded to and wrapped about the duct. Once the duct is wrapped, the endless belt assembly of the pressure applicator is stopped. With the endless belt assembly stopped, the rolls move the duct out of the apparatus.

BRIEF DESCRIPTION OF THE DRAWINGS

FIG. 1 is a perspective view, with portions broken away, of the apparatus of the present invention shown with a duct in the process of being wrapped with a cover, FIG. 2 is a schematic view of the apparatus of the present invention; and FIG. 3 is a partial side view, with portions broken away, of the apparatus of the present invention.

DETAILED DESCRIPTION OF THE PREFERRED EMBODIMENTS

The apparatus of the present invention is indicated generally by reference numeral 20. The apparatus includes a supply roll station 22, a cutter station 24, a feed station 26, and a wrapping and bonding station 28.

The supply roll station comprises a roll support frame 30 provided with a pair of yokes 32 which receive and support the ends of a roll support shaft 34. With this construction a supply roll 36 of the laminated cover material is free to rotate and feed material to the cutter station 24.

The cutter station 24 includes means for drawing the cover material from the roll 36 and feeding the cover material through the cutter station to the feed station 26. As shown the means comprises a pair of feed rolls 38 and 40, the cover material passes between these rolls which grip the material and feed it to a conventional chopper assembly 42. Shafts of the rolls 38 and 40 are rotatably mounted in conventional bearing assemblies and the rolls are driven by a motor through a conventional drive assembly employing a magnetic clutch (not shown). Once a predetermined length of the cover material has passed through the chopper assembly 42, the feed of material is stopped and the chopper assembly is actuated to sever the cover material transversely into sheets 44 of finite lengths. The chopper assembly can be hydraulically or pneumatically actuated, as shown, through double acting piston and cylinder assemblies or other conventional means can be utilized to effedt the chopping stroke of a cutter blade 46 against a backing plate 48. The piston and cylinder assemblies are actuated through a valve which pressurizes and vents the assemblies to effect the chopping and return strokes of the blade.

The feed station 26 comprises an endless belt assembly 50 which is carried on a support frame 52. The endless belt assembly includes a series of endless belts 54 which are trained about a first series of rolls 56 and a second series of rolls 58. The rolls 56 and 58 are mounted on shafts 60 and 62 respectively. The shafts 60 and 62 extend parallel to each other and feed folls 38 and 40. The shafts are mounted at each end in conventional bearing assemblies which are affixed to the support frame 52. The endless belts 54 are driven by a motor 64 through a magnetic clutch, drive belt and sheave assembly 66. The belts 54 are normally driven at the same surface speed as the feed rolls 38 and 40. However, the belts 54 are driven for a longer period of time to effect a separation between successive pieces or sheets 44 of the cover material. The upper surfaces of the belts 54 on their upper runs are level with the upper surface of the backing plate 48 in the cutting station 24 so that the pieces 44 of the cover material are readily passed from the cutter station to the feed station.

As best shown in FIG. 3, the feed station 26 is provided with an aligning and stopping mechanism 68 for properly aligning the pieces 44 of the cover material for feed into the wrapping and bonding station 28 and for preventing more than one piece of the cover material from being fed into the wrapping and bonding station 28 per wrapping cycle. The mechanism includes a series of pins 70 which are extended and retracted by conventional hydraulic or pneumatic double acting piston and cylinder assemblies 72. The cylinder assemblies 72 are affixed to a bracket 73 and are spaced apart across the width of the belt assembly 50 with the pins 70 being located to be passed down between adjacent belts 54 when the pins are extended. With this construction when the pins are extended, they are contacted by the leading edge of the piece of covering material coming from the cutter station. The pins thereby stop and effect an alignment of the cover material. The mechanism 68 is also provided with a photocell 74 located between the pins 70 and the cutter station 24. When the beam of this photocell is broken by the leading edge portion of a piece of cover material the assemblies 72 are actuated through a conventional control valve to extend the pins 70.

The wrapping and bonding station 28 includes a heated roll 76, a cold roll 78, and a pressure applicator 80.

The heated roll 76 is supported in a pair of bearings 81 and is rotated by means of a motor 82 through a conventional drive belt and sheave assembly 84. The heated roll 76 is heated by conventional electrical heating elements (not shown) with the roll typically being heated to about 600°F. While the roll is heated electrically, the roll can be heated by other means such as by means of heated fluids circulated through the roll. The heated roll has an upper surface which is adjacent the discharge end of the belts 54 and at the same level as the upper surfaces of the belts 54.

The cold roll 78 is supported in a pair of bearings 86 which are mounted on adjustable support brackets 88. Each bearing 86 is welded or otherwise affixed to a horizontally extending leg 90 of one of the support brackets which are both angle members. Each support bracket 88 rides on a support beam 92 of the frame 52 with a vertical leg 94 of each bracket 88 cooperating with the support beam 92 to maintain the cold roll in parallel alignment with the heated roll 76. A pair of spaced-apart studs 96 are welded or otherwise affixed to an upper surface of each of the support beams. These studs pass through elongate slots 98 in the horizontal leg of each bracket and are provided with nuts which can be loosened to permit adjustment of the position of the cold roll and tightened down to secure the cold roll in a desired position relative to the heated roll.

The cold roll 78 is smaller in diameter than the heated roll 76 but the upper surface of the cold roll is at the same level as the upper surface of the heated roll. Typically the heated roll is 8 inches in diameter and the cold roll is 4 inches in diameter. By having one of the rolls smaller in diameter than the other roll, the rolls can be moved closer together to accommodate small diameter ducts. The use of the smaller cold roll 78 coupled with the ability to adjust this roll relative to the heated roll 76, enables the apparatus of the present invention to accommodate ducts from 4 inches to 32 inches in diameter.

As shown the cold roll 78 depends on its ambient surrounds to maintain its temperature at the proper level. However, when required, the cold roll can be provided with a conventional fluid cooling system to maintain its temperature at a desired level. The cold roll can serve not only as a support for the duct being wrapped but can also be used to help set the adhesive joining the cover to the duct. For some operations cooling by the ambient surroundings is sufficient, for others a cooling system will have to be used to keep the roll at the temperature desired.

The cold roll 74 is also driven by the motor 80 through a drive belt and sheave assembly 100 which is provided with a take-up mechanism to permit the adjustment of the cold roll relative to the heated roll. The cold roll 78 is driven at the same surface speed as heated roll 76.

The pressure applicator 80 includes an endless belt assembly 102. The endless belt assembly 102 comprises a series of endless belts 104 which are trained about a first series of rolls 106 and a second series of rolls 108. The rolls 106 and 108 are mounted on and affixed to shafts 110 and 112 respectively. The belts are driven by a motor 114 through a magnetic clutch, drive belt and sheave assembly 115 that is provided with a take-up to permit vertical adjustment of the pressure applicator 80.

The shaft 110 is mounted in a pair of bearings that are carried on adjustable support brackets 116. The support brackets 116 are slidably mounted on a pair of vertical frame members 118. The support brackets 116 are each provided with a threaded shaft 120. The shafts 120 are threaded into the brackets 116 and are each mounted in a collar 122 affixed to the respective frame member which permits the shaft to rotate but prevents axial movement of the shaft. With this construction as the shafts 120 are turned the shaft 110 is raised or lowered to raise or lower the pressure applicator 80 to accommondate a specific size duct.

The shaft 112 is mounted in a pair of bearings carried by frame members 124. The frame members 124 are a pair of bars which extend parallel to the belts 104 and are supported on the shaft 110 by a pair of bearings which permit relative rotation between the shaft 110 and the bars 124.

A pair of double acting hydraulic or pneumatic piston and cylinder assemblies 128 are provided to pivot the frame members 124 and thus the pressure applicator about the shaft 110. Each piston and cylinder assembly is pivotally secured at one end to one of the frame members 124 and at the other end to a support bracket 130. The piston and cylinder assemblies are actuated by a conventional control valve. With these assemblies the pressure applicator can be pivoted about the shaft 110 and the desired amount of pressure can be applied to a duct to press it against the heated roll and the cold roll.

The wrapping and bonding station 28 is also provided with a loading conveyor 132 for automatically positioning duct in the wrapping and bonding station. The loading conveyor includes an endless chain 134 which has a series of spaced apart pins 136 for engaging the ducts, the chain is trained about a drive sprocket 138 and an idler sprocket 140. One sprocket is positioned adjacent the discharge end of a conveyor (e.g., a V-shaped conveyor) which delivers the duct from the duct forming apparatus to a point adjacent one side of the wrapping and bonding station. The other sprocket is positioned on the opposite side of the wrapping and bonding station. Both sprockets are supported by conventional bearing assemblies and are positioned relative the rolls 76 and 78 to guide the chain parallel to the axes of these rolls in a vertical plane intermediate the axes of these rolls. The drive sprocket is driven by a motor (not shown) through a conventional magnetic clutch, drive belt and sheave assembly. The pins project upwardly from the chain on the upper run of the chain to thereby engage the duct and convey the duct into the wrapping and bonding station.

The wrapping and bonding station is also provided with a stop plate and contol switch mechanism 142 which properly locates the duct in the station and initiates the covering operation. While various assemblies can be used, the mechanism includes a backing plate 144 which is affixed to the frame and a contact plate 146 which is engaged by the duct. The contact plate 146 is secured to the backing plate by four studs which are located adjacent the corners of the plates. The studs are welded to the contact plate and are slidably received in apertures of the backing plate. Springs carried on the studs intermediate the plates normally urge the contact plate away from the backing plate. A control switch 148 is mounted on the backing plate with its actuating button projecting toward the contact plate. When the contact plate is depressed by a duct the switch is actuated to start the wrapping operation.

In operation a conventional master switch is turned on supplying power to the motors of the apparatus, the control switch 148 and the photocell 74. Since the drive assembly for the heated roll 76 and the cold roll 78 has no clutch assembly, these rolls commence to rotate and continue to rotate until the master switch is turned off. Through a conventional control system the magnetic clutch of the drive assembly for the loading conveyor 132 is engaged and a duct from the conveyor of the duct forming apparatus is picked up by the loading conveyor of the wrapping and bonding station. The loading conveyor 132 carries the duct into the wrapping and bonding station 28 until the duct depresses the contact plate 146 to actuate the switch 148. The depression of this switch actuates a control which disengages the clutch of the drive assembly for the loading conveyor 132 to stop the conveyor, effects the lowering of the pressure applicator 80 into contact with the duct, and raises the aligning pins 70 to permit a sheet 44 of the cover material to be fed into the wrapping and bonding station. Simultaneously, the control switch actuates a timer control which engages the magnetic clutches of the drive assemblies for the feed rolls 38 and 40, the belts 54 of the feed station and the belts 104 of the pressure applicator. Thus, when the pressure applicator 80 comes down into contact with the duct, the belts 104 are moving and help to rotate the duct while maintaining the duct in a fixed position. A sheet 44 of the cover material is fed by the belts 54 of the feed station between the heated roll 76 and the duct. Additional cover material is drawn off the supply roll 36 and fed through the chopper station 24. The material is fed through the chopper station 24 for a predetermined length of time until a desired length of material has passed through the station. The clutch of the drive assembly for the feed rolls 38 and 40 is then disengaged and the feed rolls 38 and 40 are then stopped. The control valve for the chopper 42 is then actuated to sever the material with the cutter blade 46. The belts 54 of the feed station 26 are still moving so they carry the newly formed sheet of the cover material from the cutter station toward the wrapping and bonding station. As the sheet travels through the feed station it cuts the beam of the photocell 74 located between the cutter station and the aligning and stopping mechanism 68. Once the beam of the photocell is cut, the aligning and stopping mechanism is actuated to lower the pins 70 which are then engaged by the leading edge of the piece. Forward movement of the sheet 44 is thereby stopped and if the sheet is out of alignment the continuing movement of the belts 54 brings the sheet 44 into alignment whereby the leading edge contacts all three of the pins 70.

The sheet 44, that has been fed from the feed station 26 into the wrapping and bonding station 28, is heated as it passes over the heated roll 76 to a point where the adhesive becomes tacky. The cover is pressed against the duct by the heated roll 76 and becomes adhered to the duct as it is wrapped about the duct. The cold roll can serve to help set the adhesive if required.

The timer control disengages the clutches of drive assemblies for the belts 54 of the feed station and the belts 104 of the pressure applicator after the duct has been rotated for about one and one-quarter turns. The time setting for the timer control can be easily determined from the outside diameter of the duct and the rate of feed of the cover material.

Once the belts 104 of the pressure applicator 80 are stopped, the rotation imparted to the duct by the heated roll 76 and the cold roll 78 cause the duct to move out of the station for packaging. After a predetermined period of time, which is sufficient to permit the ejection of the duct, the timer control causes the pressure applicator to be raised, the photocell control to be reset, and the loading conveyor to be started to bring a duct into the wrapping and bonding station. The above cycle is then repeated.

What is claimed is:

1. Method for applying a cover to a tubular duct comprising:
   a. locating a tubular duct on means for supporting the duct which includes a heated roll and a second roll in contact with an outer surface of the duct,
   b. effecting rotation of the duct about its longitudinal axis while maintaining the duct in a fixed location by rotating said rolls at the same surface speed,
   c. feeding a cover of finite length and having a heat activated adhesive on a major face thereof intermediate the heated roll and the duct to heat the adhesive and bring the major face with the adhesive into contact with the outer surface of the duct,
   d. applying pressure to the duct to cause the heated roll to be pressed against the duct by means of pressure applying means which has a surface speed equal to the surface speeds of said rolls and which engages the outer surfaces of the duct on a portion of the outer surface generally diametrically opposed to the support means,
   e. rotating the duct until the cover is wrapped about the duct, and
   f. effecting movement of the duct away from the support means after the cover has been wrapped about the duct by stopping movement of the pressure applying means while continuing the rotation of said rolls.

2. The method as defined in claim 1 wherein the cover is cooled by said second roll to help set the adhesive after the cover has been brought into contact with the outer surface of the duct.

3. Apparatus for applying a cover having a major surface of a heat activated adhesive to tubular duct comprising:
   a. means for supporting and rotating a duct while maintaining the duct in a fixed location including first and second rolls located adjacent each other and extending parallel with respect to each other and means for rotating said rolls at the same surface speed,
b. means for bringing a cover into contact with an outer surface of the duct as it is rotated and for heating the cover to activate an adhesive on the cover including said first roll and means for heating said first roll,
c. means for applying pressure to the duct to cause said first and second rolls to be pressed against the duct, said pressure applying means being located to engage the outer surface of the duct on a portion of the outer surface diametrically opposed to the support means, and means for driving said pressure applying means at a surface speed equal to the surface speeds of said first and second rolls, and
d. means for stopping said pressure applying means while said first and second rolls continue to rotate to eject the duct from the apparatus after the duct has been wrapped.

4. The apparatus as defined in claim 3 including:
a. means for setting the adhesive after the cover has been brought into contact with the duct by the first roll including said second roll and means for cooling said second roll.

5. Apparatus as defined in claim 3 comprising:
a. means for adjusting the location of said first and second rolls relative to each other in a direction perpendicular to their longitudinal axes to enable the apparatus to accommodate duct of different diameters.

6. Apparatus as defined in claim 5 wherein:
a. one of said first and second rolls is smaller in diameter than the other of said rolls to enable the apparatus to accommodate small diameter ducts.

7. Apparatus as defined in claim 3 wherein:
a. the pressure applying means comprises endless belt means which engages the outer surface of the duct on a portion of the surface diametrically opposed to the support means 8. Apparatus as defined in claim 2 and 3 further comprising:
a. means for mounting a supply roll of the cover material, and
b. means for cutting the cover material into sheets of finite lengths.

9. Apparatus as defined in claim 8 wherein:
a. the feed means includes means for preventing more than one sheet of the cover material from being fed between the heated roll and the duct during a wrapping cycle.

10. Apparatus as defined in claim 3 and further comprising:
a. means for introducing the duct onto the support means and for locating the duct on the support means.

* * * * *

UNITED STATES PATENT OFFICE
CERTIFICATE OF CORRECTION

PATENT NO. : 3,890,182
DATED : June 17, 1975
INVENTOR(S) : Rupert Douglas Terry

It is certified that error appears in the above-identified patent and that said Letters Patent are hereby corrected as shown below:

Column 2, line 32, "effect" has been misspelled

Column 2, line 44, "folls" should read -- rolls --.

Column 6, line 48 "surfaces" should read -- surface --.

Column 8, line 12, "Claims 2 and 3 should read -- Claim 3 --.

Signed and Sealed this

First Day of February 1977

[SEAL]

Attest:

RUTH C. MASON
*Attesting Officer*

C. MARSHALL DANN
*Commissioner of Patents and Trademarks*